(12) United States Patent
Xu et al.

(10) Patent No.: US 11,448,219 B2
(45) Date of Patent: Sep. 20, 2022

(54) PUMP BODY WITH OIL GUIDE CHANNEL FOR LUBRICATING BETWEEN THE END FACE OF THE INNER RING AND THE CONTACT FACE OF THE FLANGE STRUCTURE

(71) Applicant: GREE ELECTRIC APPLIANCES, INC. OF ZHUHAI, Zhuhai (CN)

(72) Inventors: Jia Xu, Zhuhai (CN); Pengkai Wan, Zhuhai (CN); Fayou Luo, Zhuhai (CN); Fei Wu, Zhuhai (CN); Wenjiao Sun, Zhuhai (CN); Jinfei Shi, Zhuhai (CN); Guomang Yang, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 0 days.

(21) Appl. No.: 17/049,066

(22) PCT Filed: Dec. 12, 2018

(86) PCT No.: PCT/CN2018/120662
§ 371 (c)(1),
(2) Date: Oct. 20, 2020

(87) PCT Pub. No.: WO2020/037889
PCT Pub. Date: Feb. 27, 2020

(65) Prior Publication Data
US 2021/0254621 A1 Aug. 19, 2021

(30) Foreign Application Priority Data
Aug. 21, 2018 (CN) .......................... 201810956709.7

(51) Int. Cl.
*F04C 29/02* (2006.01)
*F04C 18/344* (2006.01)
(Continued)

(52) U.S. Cl.
CPC ............ *F04C 29/02* (2013.01); *F01C 21/108* (2013.01); *F04C 18/344* (2013.01);
(Continued)

(58) Field of Classification Search
CPC ...... F04C 29/02; F04C 18/344; F04C 29/028; F04C 2240/50; F01C 21/08; F16C 33/586;
(Continued)

(56) References Cited

U.S. PATENT DOCUMENTS 4,463,994 A * 8/1984 Eliason ............... F16C 33/6677
384/506
8,562,224 B2 * 10/2013 Duffy ...................... F16C 33/60
384/475

FOREIGN PATENT DOCUMENTS

| CN | 105952642 A | 9/2016 |
| CN | 205578522 U | 9/2016 |

(Continued)

OTHER PUBLICATIONS

International Search Report for corresponding application PCT/CN2018/120662 filed Dec. 12, 2018; dated Apr. 9, 2019.

*Primary Examiner* — Mary Davis
(74) *Attorney, Agent, or Firm* — Cantor Colburn LLP

(57) ABSTRACT

The disclosure discloses a pump body and a compressor with the pump body. The pump body includes: a flange structure; a bearing, the bearing being provided with an inner ring and an outer ring, the inner ring being rotatably disposed on the flange structure, and an end face of the inner ring being abutted against a contact face of the flange structure; and an oil guide channel provided inside a side wall of the inner ring, or inside the flange structure, or the side wall of the inner ring and inside the flange structure, an outlet of the oil guide channel being positioned between the end face of the inner ring and the contact face of the flange structure, so as to introduce lubricating oil between the end face of the inner ring and the contact face of the flange structure.

19 Claims, 9 Drawing Sheets

(51) Int. Cl.
*F16C 33/66* (2006.01)
*F01C 21/10* (2006.01)
*F16C 33/58* (2006.01)
*F16C 35/04* (2006.01)

(52) U.S. Cl.
CPC .......... *F04C 29/028* (2013.01); *F16C 33/586* (2013.01); *F16C 33/6659* (2013.01); *F16C 33/6677* (2013.01); *F16C 35/04* (2013.01); *F04C 2240/50* (2013.01); *F16C 33/583* (2013.01)

(58) Field of Classification Search
CPC ... F16C 33/6659; F16C 33/6677; F16C 35/04
See application file for complete search history.

(56) References Cited

FOREIGN PATENT DOCUMENTS

| | | | |
|---|---|---|---|
| CN | 107524600 A | 12/2017 | |
| CN | 108916234 A | 8/2018 | |
| CN | 108825663 A | 11/2018 | |
| JP | 2001004004 A | 1/2001 | |
| JP | 2009174701 A | * 8/2009 | .......... F16C 33/3843 |

* cited by examiner

PUMP BODY WITH OIL GUIDE CHANNEL FOR LUBRICATING BETWEEN THE END FACE OF THE INNER RING AND THE CONTACT FACE OF THE FLANGE STRUCTURE

CROSS-REFERENCE TO RELATED APPLICATIONS

The present disclosure is a national stage application of International Patent Application No. PCT/CN2018/120662, which is filed on Dec. 12, 2018, and claims priority to Chinese Patent Application No. 201810956709.7, filed on Aug. 21, 2018 and entitled "Pump Body and Compressor with Pump Body", the contents of which are hereby incorporated by reference in its entirety.

TECHNICAL FIELD

The disclosure relates to a technical field of compressors, in particular to a pump body and a compressor with the pump body.

BACKGROUND

A compression chamber of a sliding vane compressor is formed by separating an inner wall of a cylinder by a sliding vane, so in a sliding vane compressor known to inventors, a relative speed between a head of the sliding vane and the inner wall of the cylinder is very high, which leads to excessive friction between the head of the sliding vane and the inner wall of the cylinder, and the excessive friction affects a power consumption and performance. Long-term excessive friction causes wear and thus affect a reliability of the compressor.

In order to reduce friction and improve reliability, some solutions optimize and transform a cylinder part of the sliding vane compressor known to inventors, that is, replace a cylinder structure known to inventors with a bearing. Because an inner ring of a rolling bearing is rotated, a relative speed between the head of the sliding vane and the inner ring of the rolling bearing is greatly reduced compared with a fixed cylinder, and a friction between the head of the sliding vane and the inner ring of the rolling bearing also is greatly reduced, thus achieving an purpose of reducing friction and improving reliability.

However, this solution brings about a new friction pair, namely a friction between an end face of the inner ring of the rolling bearing and a flange structure. During running at a low rotation speed, the friction is not obvious. Once a running speed is improved, excessive friction appears. Similar to the above, this also leads to increased power consumption or reliability problems.

SUMMARY

Some embodiments of the disclosure provide a pump body and a compressor with the pump body to solve a problem of excessive friction between an inner ring and a flange structure of the pump body in the art known to inventors.

Some embodiments of the disclosure provide a pump body, which includes: a flange structure, a bearing, and an oil guide channel. The bearing is provided with an inner ring and an outer ring, the inner ring is rotatably disposed on the flange structure, and an end face of the inner ring is abutted against a contact face of the flange structure. The oil guide channel is provided inside a side wall of the inner ring, or inside the flange structure, or a side wall of the inner ring and inside the flange structure, an outlet of the oil guide channel is positioned between the end face of the inner ring and the contact face of the flange structure, so as to introduce lubricating oil between the end face of the inner ring and the contact face of the flange structure.

In some embodiments, the oil guide channel is provided inside the side wall of the inner ring, and the outlet of the oil guide channel is positioned on the end face of the inner ring.

In some embodiments, an inlet of the oil guide channel is positioned on a peripheral face of the inner ring, so as to introduce lubricating oil from an area between the inner ring and the outer ring.

In some embodiments, the oil guide channel includes: a first channel, the outlet being positioned on the first channel; and a second channel communicated with the first channel, the inlet being positioned on the second channel.

In some embodiments, there are a plurality of first channels, and the plurality of first channels are spaced from each other along a circumferential direction of the inner ring.

In some embodiments, an extension direction of each of the plurality of first channels is parallel to an axis of the inner ring, and distances between every two adjacent first channels in the plurality of first channels are equal.

In some embodiments, an included angle is formed between an extension direction of the second channel and an extension direction of each of the plurality of first channels. There are a plurality of second channels. The plurality of second channels are spaced from each other along the circumferential direction of the inner ring, and the plurality of second channels are communicated with the plurality of first channels in one-to-one correspondence.

In some embodiments, the second channel is an annular groove. The annular groove is disposed around an outer circumferential surface of the inner ring. The plurality of first channels are communicated with the annular groove. An opening of the annular groove forms the inlet.

In some embodiments, the flange structure includes a first flange and a second flange. Two end faces of the inner ring are abutted against the first flange and the second flange respectively. Both the two end faces of the inner ring are provided with the outlet.

In some embodiments, the bearing further includes: a cage disposed between the outer ring and the inner ring; and a rolling element rotatably disposed on the retainer. A third channel is disposed in the rolling element, and the third channel is configured to introduce lubricating oil between an end face of the rolling element and a contact face of the retainer.

In some embodiments, the pump body further includes a fourth channel disposed on the flange structure, and the fourth channel is configured to introduce lubricating oil to the area between the inner ring and the outer ring.

In some embodiments, the pump body further includes a main axis rotatably disposed in the inner ring in a penetration manner. A fifth channel is provided in the main axis. The fifth channel is communicated with the fourth channel, and the fifth channel is configured to introduce lubricating oil from outside.

Some embodiments of the present disclosure provide a compressor, which includes the above pump body.

In the technical solution of some embodiments in the present disclosure, the oil guide channel is provided inside the side wall of the inner ring or inside the flange structure, and the outlet of the oil guide channel is positioned between the end face of the inner ring and the contact face of the flange structure. In this way, lubricating oil is introduced between the end face of the inner ring and the contact face of the flange structure through the oil guide channel, so as to play a good lubrication effect, reduce a friction between the end face of the inner ring and the flange structure, and thus improve reliability of the pump body and reduce a power consumption.

BRIEF DESCRIPTION OF THE DRAWINGS

The accompanying drawings constituting a part of the present disclosure are used for providing further understanding of the present disclosure. Schematic embodiments of the present disclosure and description thereof are used for illustrating the present disclosure and not intended to form an improper limit to the present disclosure. In the accompanying drawings.

Figure 1:
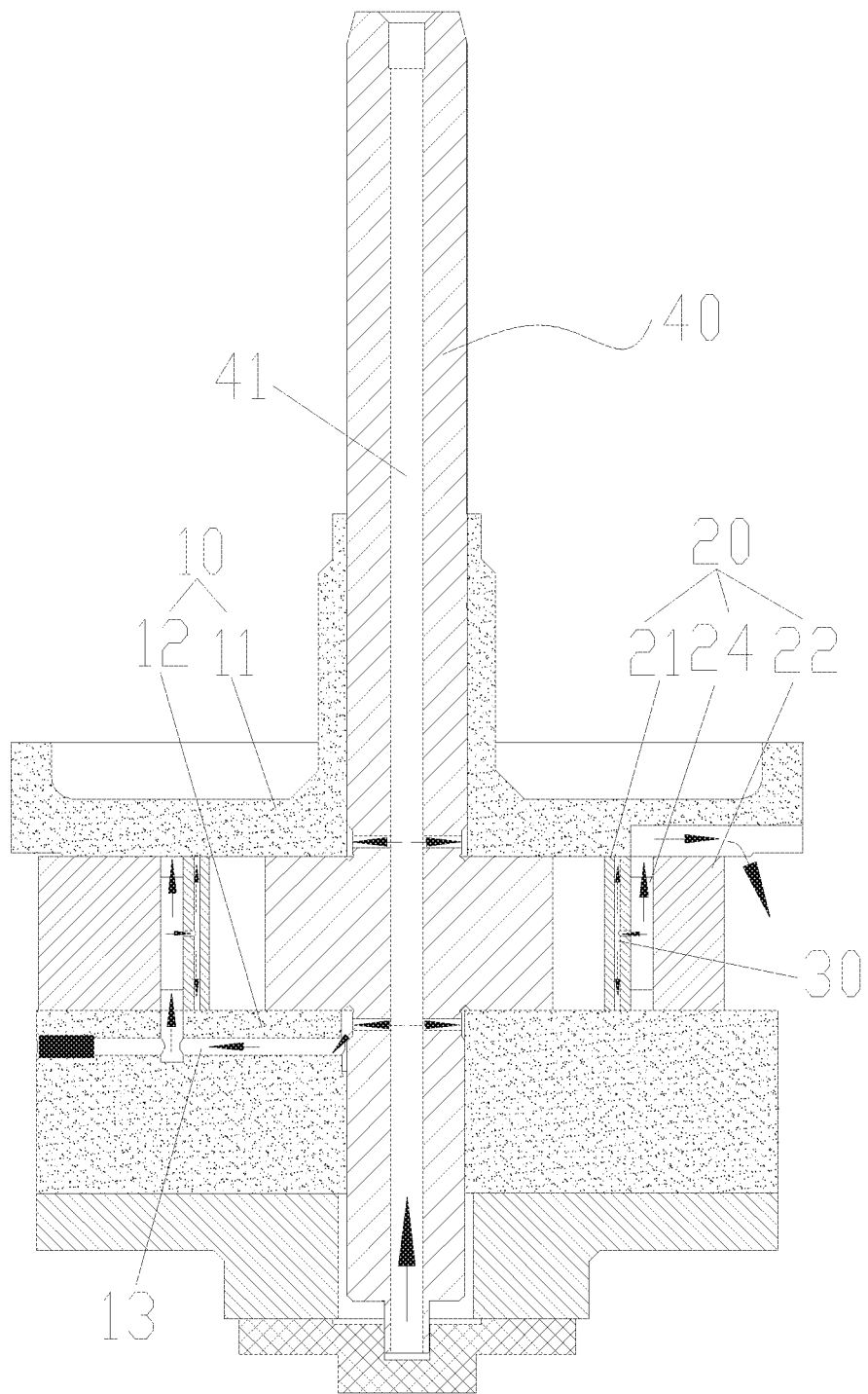
FIG. 1 illustrates a section view of a pump body according to embodiment 1 of some embodiments in the disclosure.

The above accompanying drawings include the following reference numbers:

10. flange structure; 11. first flange; 12. second flange; 13. fourth channel; 20. bearing; 21. inner ring; 22. outer ring; 23. retainer; 24. rolling element; 30. oil guide channel; 31. first channel; 32. second channel; 40. main axis; 41. fifth channel.

DETAILED DESCRIPTION OF THE EMBODIMENTS

The technical solutions in the embodiments of the disclosure are clearly and completely described below in combination with the accompanying drawings in the embodiments of the disclosure. It is apparent that the described embodiments are only a part of the embodiments of the present disclosure but not all. The description of at least one exemplary embodiment below is actually just illustrative, and is never seen as any limit to the disclosure and its disclosure or use. Based on the embodiments of the disclosure, all the other embodiments obtained by those of ordinary skill in the art on the premise of not contributing creative effort should belong to the protection scope of the disclosure.

As shown in FIG. 1 to FIG. 6, embodiment 1 of the disclosure provides a pump body, which includes: a flange structure 10, a bearing 20, and an oil guide channel 30. The bearing 20 is provided with an inner ring 21 and an outer ring 22, the inner ring 21 is rotatably disposed on the flange structure 10, and an end face of the inner ring 21 is abutted against a contact face of the flange structure 10. The oil guide channel 30 is provided inside a side wall of the inner ring 21, or inside the flange structure 10, or the side wall of the inner ring 21 and inside the flange structure 10, an outlet of the oil guide channel 30 is positioned between the end face of the inner ring 21 and the contact face of the flange structure 10, so as to introduce lubricating oil between the end face of the inner ring 21 and the contact face of the flange structure 10.

In the technical solution of some embodiments in present disclosure, the oil guide channel 30 is provided inside the side wall of the inner ring 21 or inside the flange structure 10, and the outlet of the oil guide channel 30 is positioned between the end face of the inner ring 21 and the contact face of the flange structure 10. In this way, lubricating oil is introduced between the end face of the inner ring 21 and the contact face of the flange structure 10 through the oil guide channel 30, so as to play a good lubrication effect, reduce a friction between the end face of the inner ring 21 and the flange structure 10, and thus improve a reliability of the pump body and reduce a power consumption.

In some embodiments, the oil guide channel 30 is provided inside the side wall of the inner ring 21, so as to convey lubricating oil from an inside of the side wall of the inner ring 21 to an area between the end face of the inner ring 21 and the contact face of the flange structure 10. The oil guide channel 30 also is provided inside the flange structure 10, so as to convey lubricating oil from an inside of the flange structure 10 to the area between the end face of the inner ring 21 and the contact face of the flange structure 10.

In some embodiments, the oil guide channel 30 is provided inside the side wall of the inner ring 21, and the outlet of the oil guide channel 30 is positioned on the end face of the inner ring 21. In this way, lubricating oil is conveyed from the inside of the side wall of the inner ring 21 to the area between the end face of the inner ring 21 and the contact face of the flange structure 10, thus playing a good lubrication effect, and reducing the friction between the end face of the inner ring 21 and the flange structure 10.

As shown in FIG. 1, an inlet of the oil guide channel 30 is positioned on a peripheral face of the inner ring 21, so as to introduce lubricating oil from an area between the inner ring 21 and the outer ring 22. Because the area between the inner ring 21 and the outer ring 22 has a large space, more lubricating oil is stored, so that conveying lubricating oil from the area between the inner ring 21 and the outer ring 22 to the oil guide channel 30 ensures a good lubrication effect.

In some embodiments, the oil guide channel 30 includes: a first channel 31, the outlet being positioned on the first channel 31; and a second channel 32 communicated with the first channel 31, the inlet being positioned on the second channel 32. In this way, lubricating oil is conveyed from the area between the inner ring 21 and the outer ring 22 to the area between the end face of the inner ring 21 and the contact face of the flange structure 10 through the second channel 32 and the first channel 31.

Figure 3:
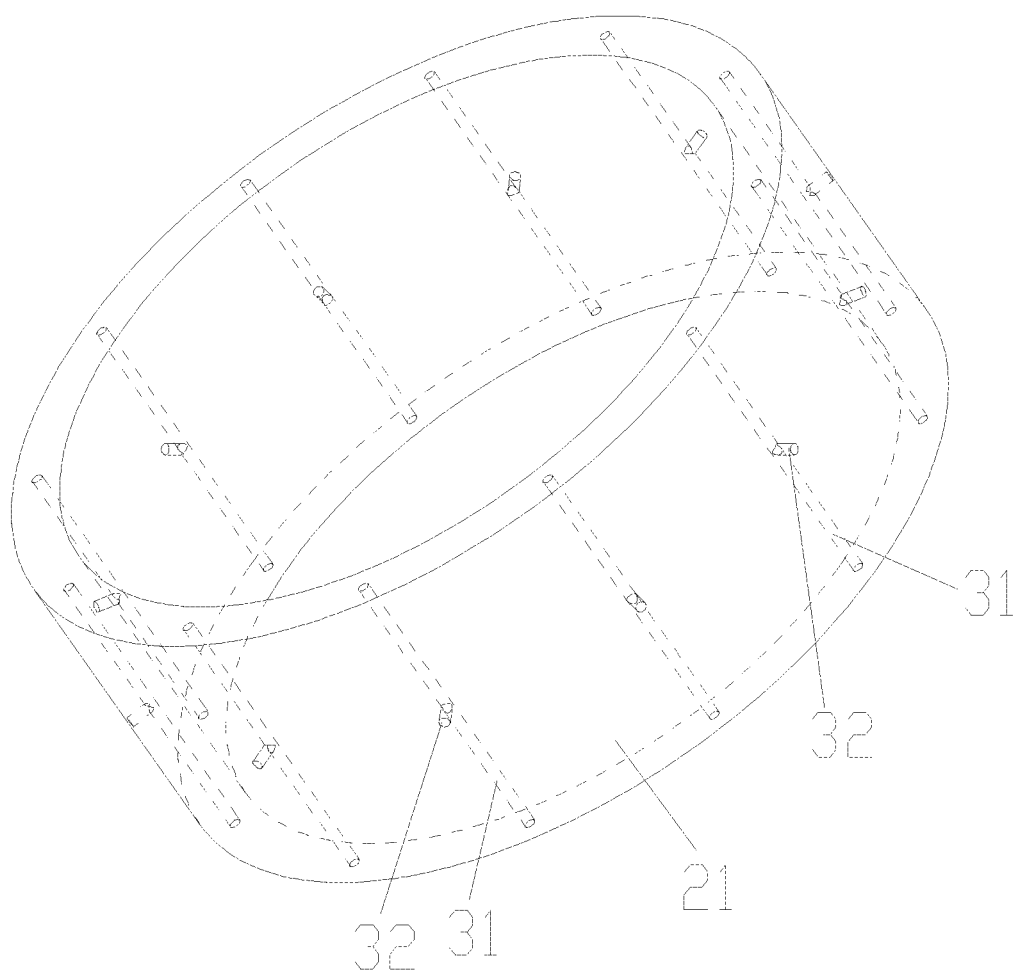
FIG. 3 illustrates a perspective drawing of an inner ring in FIG. 1.

As shown in FIG. 3, there are plurality of first channels 31, and the plurality of first channels 31 are spaced from each other along a circumferential direction of the inner ring 21. In this way, lubricating oil is conveyed to different positions between the end face of the inner ring 21 and the contact face of the flange structure 10 through the plurality of first channels 31, so as to evenly distribute lubricating oil and thus improve the lubrication effect.

In some embodiments, an extension direction of each of the plurality of first channels 31 is parallel to an axis of the inner ring 21, and distances between every two adjacent first channels 31 in the plurality of first channels are equal. In this way, distribution of lubricating oil between the end face of the inner ring 21 and the contact face of the flange structure 10 is more even. In some embodiments, an axis of the first channel 31 is disposed at a position equidistant from the inner surface and the outer surface of the inner ring 21.

Figure 4:
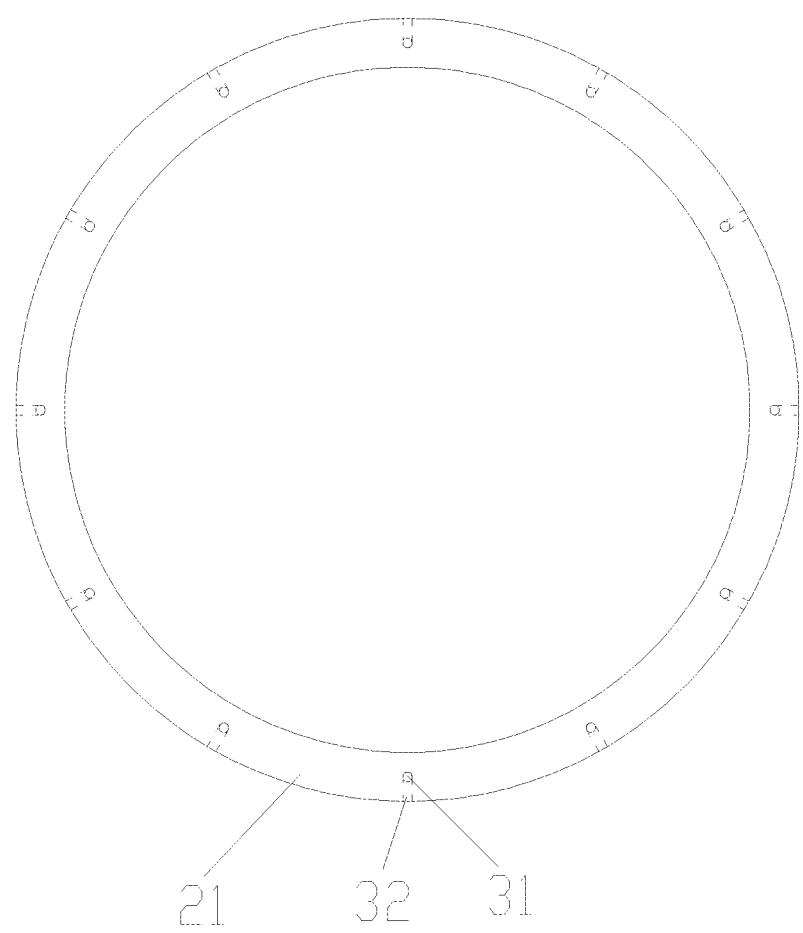
FIG. 4 illustrates a view of an end face of the inner ring in FIG. 3.
Figure 5:
FIG. 5 illustrates a section view of the inner ring in FIG. 3.

As shown in FIG. 3 to FIG. 5, in some embodiments, an included angle is formed between an extension direction of the second channel 32 and an extension direction of each of the plurality of first channels 31. There are a plurality of second channels 32. The plurality of second channels 32 are spaced from each other along the circumferential direction of the inner ring 21, and the plurality of second channels 32 are communicated with the plurality of first channels 31 in one-to-one correspondence. In this way, lubricating oil is conveyed through the plurality of second channels 32 to the corresponding first channels 31 for easy flow of lubricating oil. In some embodiments, the second channels 32 are disposed along a radial direction of the inner ring 21.

Figure 2:
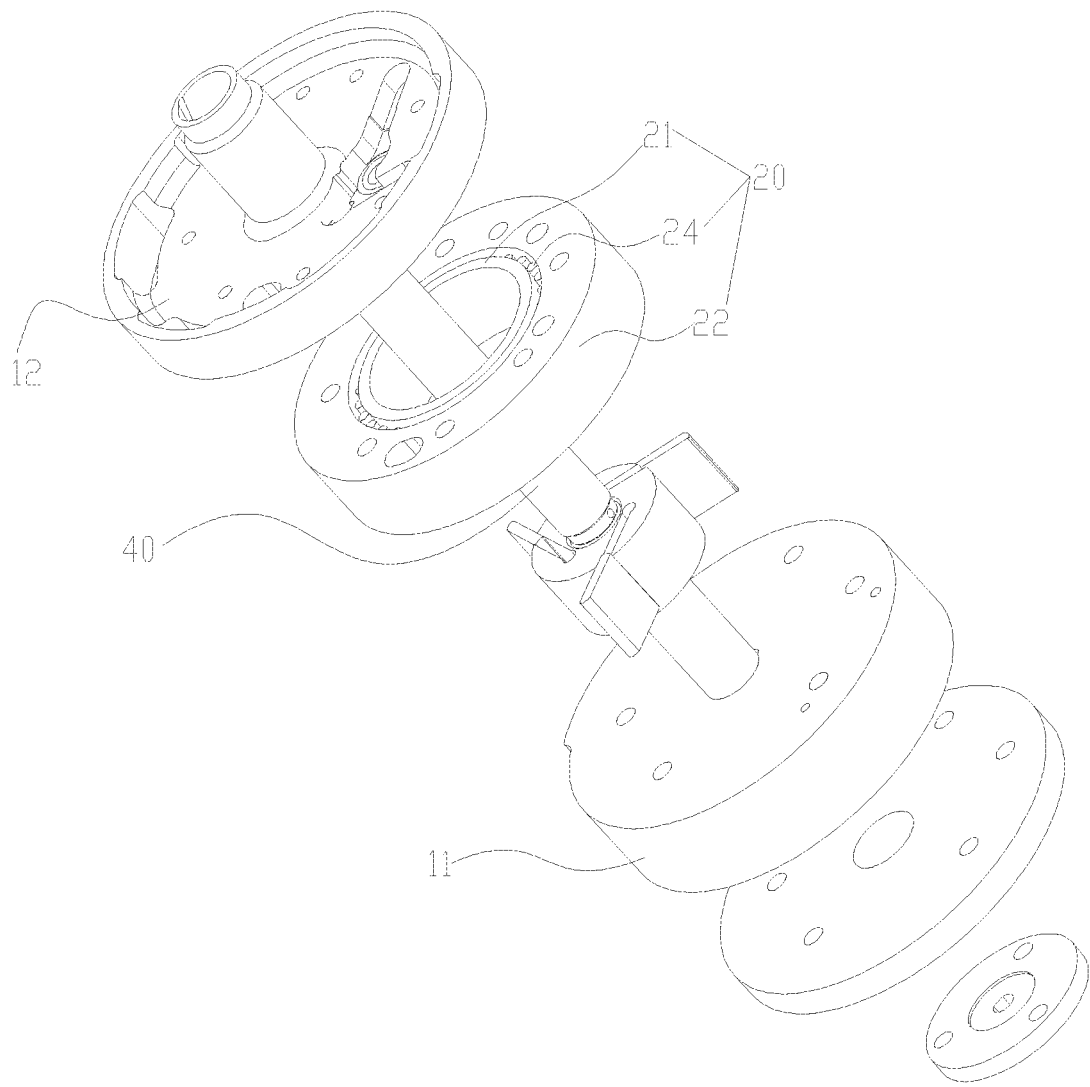
FIG. 2 illustrates an exploded view of the pump body in FIG. 1.

As shown in FIG. 1 and FIG. 2, the flange structure 10 includes a first flange 11 and a second flange 12. Two end faces of the inner ring 21 are abutted against the first flange 11 and the second flange 12 respectively. Both the two end faces of the inner ring 21 are provided with the outlet. In this way, enough lubricating oil is conveyed between one end face of the inner ring 21 and the first flange 11 to form an oil film, and enough lubricating oil is conveyed between the other end face of the inner ring 21 and the second flange 12 to form an oil film, so as to improve the lubrication effect.

In some embodiments, in order to make lubricating oil flow smoothly, an area of the minimum cross section of the oil guide channel 30 is set to be greater than 0.5 $mm^2$. In some embodiments, an area of the minimum cross section of other channels communicated with the oil guide channel 30 also is set to be greater than 0.5 $mm^2$.

Figure 6:
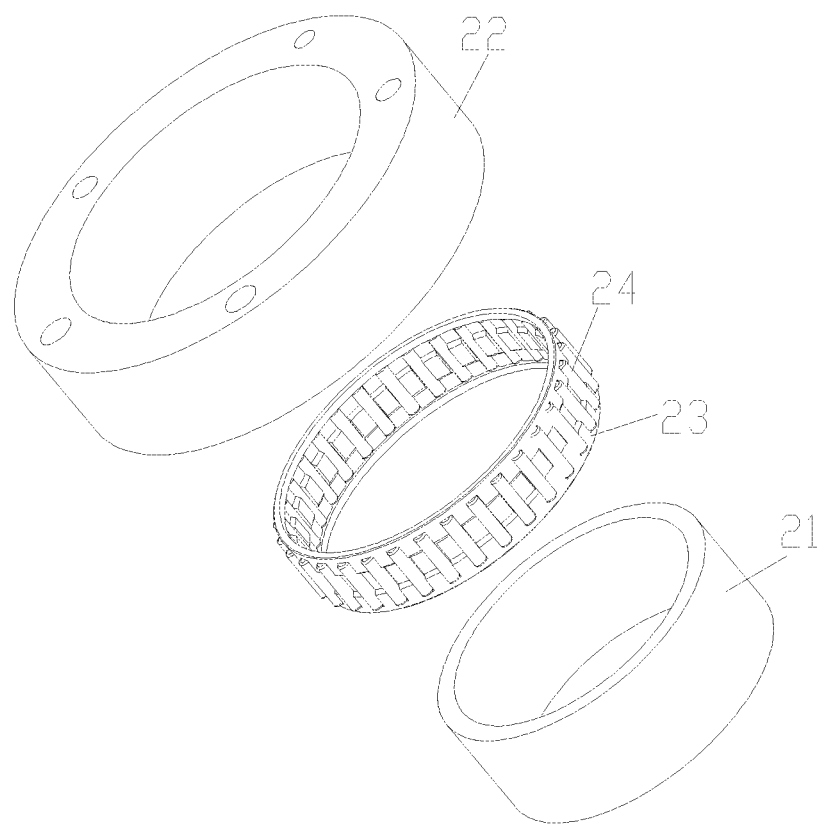
FIG. 6 illustrates a structure diagram of a bearing in FIG. 1.

As shown in FIG. 6, the bearing 20 further includes: a cage 23 disposed between the outer ring 22 and the inner ring 21; and a rolling element 24 rotatably disposed on the retainer 23. A third channel is disposed in the rolling element 24, and the third channel is configured to introduce lubricating oil between an end face of the rolling element 24 and a contact face of the retainer 23. In this way, there is enough lubricating oil between the end face of the rolling element 24 and the contact face of the retainer 23, so as to play a good lubrication effect, reduce a wear of the rolling element 24 and the retainer 23, and increase a life of the bearing 20.

In some embodiments, the pump body further includes a fourth channel 13 disposed on the flange structure 10, and the fourth channel 13 is configured to introduce lubricating oil to an area between the inner ring 21 and the outer ring 22. In this way, lubricating oil is conveyed to the area between the inner ring 21 and the outer ring 22 through the fourth channel 13, so as to ensure adequate supply of lubricating oil. Lubricating oil is introduced from an outside of the pump body. As shown in FIG. 1, the fourth channel 13 is disposed on the second flange 12, and an oil outlet of the fourth channel 13 is communicated with the area between the inner ring 21 and the outer ring 22.

In some embodiments, the pump body further includes a main axis 40 rotatably disposed in the inner ring 21 in a penetration manner. A fifth channel 41 is provided in the main axis 40. The fifth channel 41 is communicated with the fourth channel 13, and the fifth channel 41 is configured to introduce lubricating oil from outside. In this way, lubricating oil is introduced from outside through the fifth channel 41 in the main axis 40, and then conveyed to the area between the inner ring 21 and the outer ring 22 through the fourth channel 13.

In some embodiments, the pump body further includes a gear pump. The gear pump is disposed at a bottom of the main axis 40, so that lubricating oil is supplied by the gear pump for the fifth channel 41 to facilitate a flow of the lubricating oil.

Figure 7:
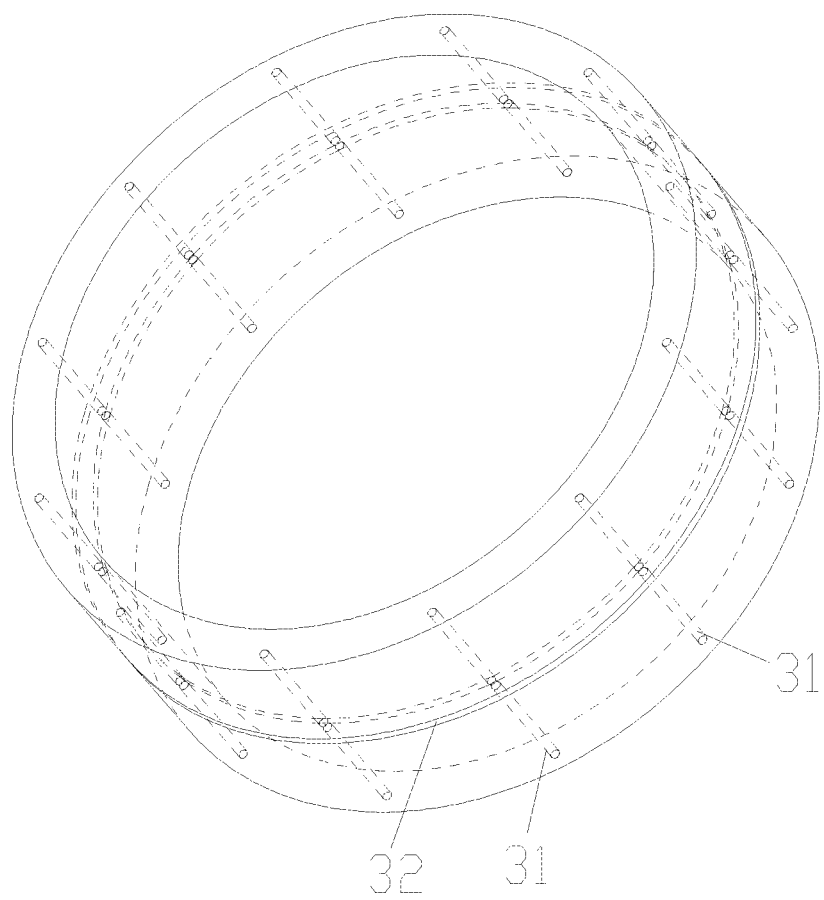
FIG. 7 illustrates a perspective drawing of the inner ring in a pump body provided in embodiment 2 of the disclosure.
Figure 8:
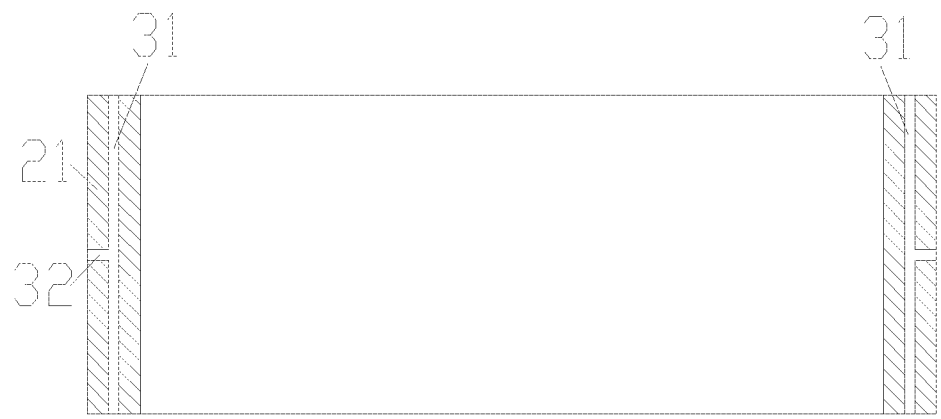
FIG. 8 illustrates a section view of the inner ring in FIG. 7.

As shown in FIG. 7 and FIG. 8, embodiment 2 of the disclosure provides another pump body. Different from embodiment 1, the second channel 32 of the oil guide channel 30 is an annular groove, the annular groove is disposed around an outer circumferential surface of the inner ring 21, the plurality of first channels 31 are communicated with the annular groove, and an opening of the annular groove forms the inlet. In this way, lubricating oil is conveyed to plurality of second channels 32 through the annular groove.

Figure 9:
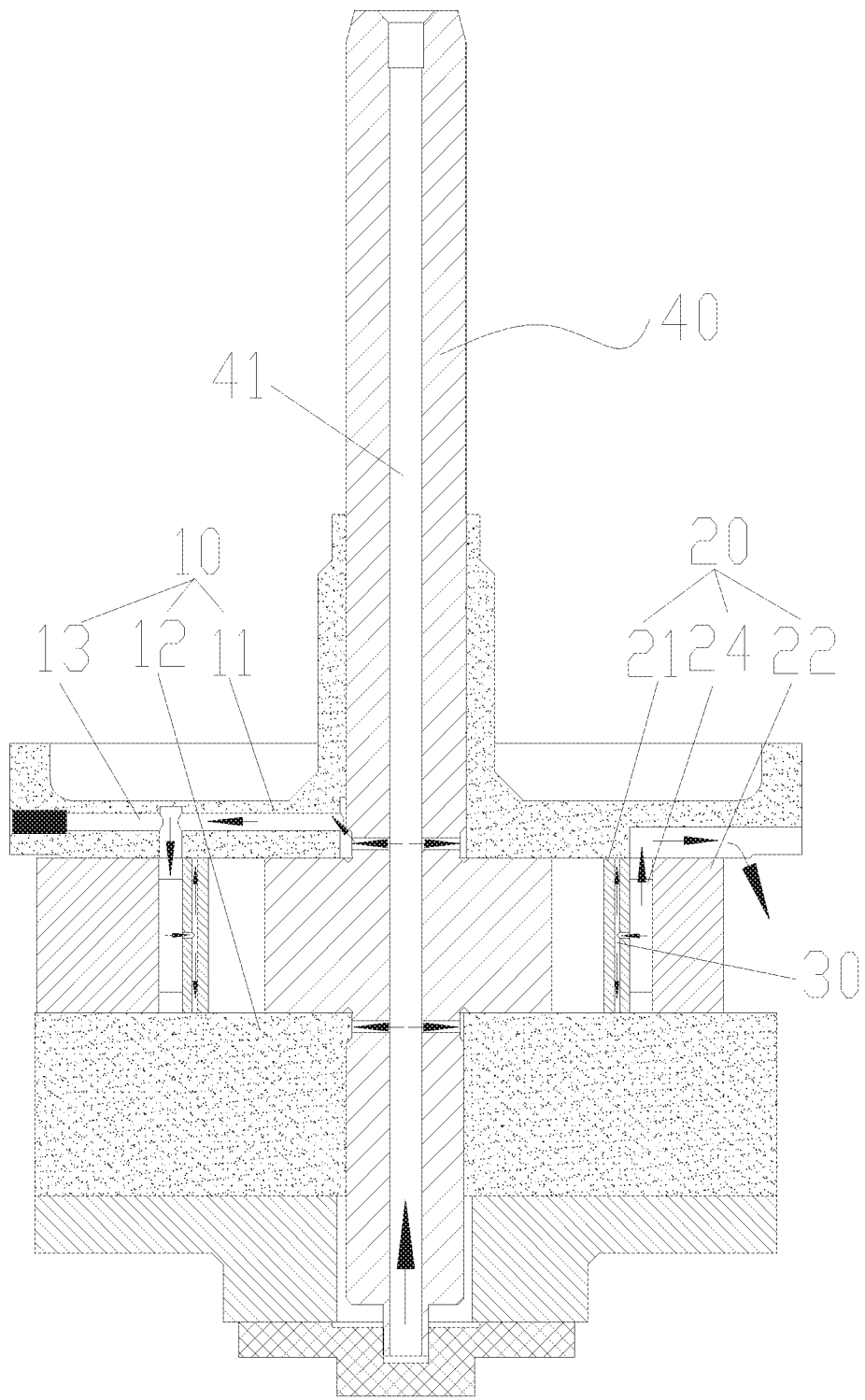
FIG. 9 illustrates a section view of a pump body provided in embodiment 3 of the disclosure.

As shown in FIG. 9, embodiment 3 of the disclosure provides another pump body. Different from embodiment 1, the fourth channel 13 is disposed on the first flange 11, and the oil outlet of the fourth channel 13 is communicated with the area between the inner ring 21 and the outer ring 22.

Embodiment 4 of the disclosure provides a compressor, which includes the above pump body. The oil guide channel 30 is provided inside the side wall of the inner ring 21 or inside the flange structure 10, and the outlet of the oil guide channel 30 is positioned between the end face of the inner ring 21 and the contact face of the flange structure. In this way, lubricating oil is introduced between the end face of the inner ring 21 and the contact face of the flange structure 10 through the oil guide channel 30, so as to play a good lubrication effect, reduce the friction and wear of the end face of the inner ring 21 and the flange structure 10, and thus improve the reliability of the compressor and reduce the power consumption.

The above is only the embodiments of the present disclosure and not intended to limit the present disclosure; for those skilled in the art, the present disclosure may have various modifications and changes. Any modifications, equivalent replacements, improvements and the like within the spirit and principle of the present disclosure should fall within the protection scope of the claims of the present disclosure.

What is claimed is:

1. A pump body, comprising:
   a flange structure;
   a bearing, the bearing being provided with an inner ring and an outer ring, the inner ring being rotatably disposed on the flange structure, and an end face of the inner ring being abutted against a contact face of the flange structure; and
   an oil guide channel provided inside a side wall of the inner ring, or inside the flange structure, or both inside the side wall of the inner ring and inside the flange structure, an outlet of the oil guide channel being positioned between the end face of the inner ring and the contact face of the flange structure, so as to introduce lubricating oil between the end face of the inner ring and the contact face of the flange structure;
   wherein the bearing further comprises:
   a retainer disposed between the outer ring and the inner ring; and
   a rolling element rotatably disposed on the retainer, a third channel being disposed in the rolling element, and the third channel being configured to introduce lubricating oil between an end face of the rolling element and a contact face of the retainer.

2. The pump body as claimed in claim 1, wherein the oil guide channel is provided inside the side wall of the inner ring, and the outlet of the oil guide channel is positioned on the end face of the inner ring.

3. The pump body as claimed in claim 2, wherein an inlet of the oil guide channel is positioned on a peripheral face of the inner ring, so as to introduce lubricating oil from an area between the inner ring and the outer ring.

4. The pump body as claimed in claim 3, wherein the oil guide channel comprises:
a first channel, the outlet being positioned on the first channel; and
a second channel communicated with the first channel, the inlet being positioned on the second channel.

5. The pump body as claimed in claim 4, wherein there are a plurality of first channels, and the plurality of first channels are spaced from each other along a circumferential direction of the inner ring.

6. The pump body as claimed in claim 5, wherein an extension direction of each of the plurality of first channels is parallel to an axis of the inner ring, and distances between every two adjacent first channels in the plurality of first channels are equal.

7. The pump body as claimed in claim 5, wherein an included angle is formed between an extension direction of the second channel and an extension direction of each of the plurality of first channels; there are a plurality of second channels; the plurality of second channels are spaced from each other along the circumferential direction of the inner ring; and the plurality of second channels are communicated with the plurality of first channels in one-to-one correspondence.

8. The pump body as claimed in claim 5, wherein the second channel is an annular groove; the annular groove is disposed around an outer circumferential surface of the inner ring; the plurality of first channels are communicated with the annular groove; and an opening of the annular groove forms the inlet.

9. The pump body as claimed in claim 3, wherein the pump body further comprises a fourth channel disposed on the flange structure, and the fourth channel is configured to introduce lubricating oil to the area between the inner ring and the outer ring.

10. The pump body as claimed in claim 9, further comprising:
a main axis rotatably disposed in the inner ring in a penetration manner; a fifth channel is provided in the main axis, the fifth channel is communicated with the fourth channel, and the fifth channel is configured to introduce lubricating oil from outside the pump body.

11. The pump body as claimed in claim 2, wherein the flange structure comprises a first flange and a second flange; two end faces of the inner ring are abutted against the first flange and the second flange respectively; and both the two end faces of the inner ring are provided with the outlet.

12. A compressor, comprising the pump body as claimed in claim 1.

13. The compressor as claimed in claim 12, wherein the oil guide channel is provided inside the side wall of the inner ring, and the outlet of the oil guide channel is positioned on the end face of the inner ring.

14. The compressor as claimed in claim 13, wherein an inlet of the oil guide channel is positioned on a peripheral face of the inner ring, so as to introduce lubricating oil from an area between the inner ring and the outer ring.

15. The compressor as claimed in claim 14, wherein the oil guide channel comprises:
a first channel, the outlet being positioned on the first channel; and
a second channel communicated with the first channel, the inlet being positioned on the second channel.

16. The compressor as claimed in claim 15, wherein there are a plurality of first channels, and the plurality of first channels are spaced from each other along a circumferential direction of the inner ring.

17. The compressor as claimed in claim 16, wherein an extension direction of each of the plurality of first channels is parallel to an axis of the inner ring, and distances between every two adjacent first channels in the plurality of first channels are equal.

18. The compressor as claimed in claim 16, wherein an included angle is formed between an extension direction of the second channel and an extension direction of each of the plurality of first channels; there are a plurality of second channels; the plurality of second channels are spaced from each other along the circumferential direction of the inner ring; and the plurality of second channels are communicated with the plurality of first channels in one-to-one correspondence.

19. The compressor as claimed in claim 16, wherein the second channel is an annular groove; the annular groove is disposed around an outer circumferential surface of the inner ring; the plurality of first channels are communicated with the annular groove; and an opening of the annular groove forms the inlet.

* * * * *